United States Patent [19]

Ingalsbe et al.

[11] Patent Number: 5,802,172

[45] Date of Patent: Sep. 1, 1998

[54] ELECTRONIC LOCK FOR COIN TELEPHONES

[75] Inventors: David L. Ingalsbe, Paynesville, Minn.; Henry L. Smith, Blair, Nebr.

[73] Assignee: Independent Technologies, Inc., Omaha, Nebr.

[21] Appl. No.: 349,431

[22] Filed: Dec. 5, 1994

[51] Int. Cl.$^6$ .................. H04M 1/00; H04M 17/00
[52] U.S. Cl. .................. 379/445; 379/451; 379/437; 379/145
[58] Field of Search .................. 379/451, 437, 379/102, 445, 453, 145; 70/277, 278, 279, 283; 194/350; 453/5

[56] References Cited

U.S. PATENT DOCUMENTS

| | | | |
|---|---|---|---|
| 3,710,136 | 1/1973 | Constable | 70/278 |
| 3,843,203 | 10/1974 | Golland et al. | 453/5 |
| 4,136,262 | 1/1979 | Clark, Jr. | 179/6.3 R |
| 4,366,348 | 12/1982 | Pope | 179/84 VF |
| 4,852,373 | 8/1989 | McGough | 70/417 |
| 4,929,880 | 5/1990 | Henderson et al. | 70/63 |
| 4,942,748 | 7/1990 | McGough | 70/389 |
| 5,038,908 | 8/1991 | McGough | 194/350 |
| 5,140,317 | 8/1992 | Hyatt, Jr. et al. | 340/825.31 |
| 5,181,406 | 1/1993 | Wolter | 70/337 |
| 5,189,694 | 2/1993 | Garland | 379/106 |
| 5,280,518 | 1/1994 | Danler et al. | 379/100 |
| 5,444,772 | 8/1995 | Coker | 379/156 |
| 5,451,757 | 9/1995 | Heath, Jr. | 379/102 |

OTHER PUBLICATIONS

Bill Black et al., "Basis of Voice Coil Actuators", *Power Conversion Intelligent Motion*, Jul. 1993, pp. 44–46.
Robert N. Boggs, "Electronic/Mechanical Combo Maximizes Security", *Design News*, Mar. 7, 1994.
Insite VLS, brochure form Medeco Security Locks, Inc.
Elks 9100U Electromechanical Lock and Key System, brochure from Abloy Security, Inc.

*Primary Examiner*—Jack Chiang
*Attorney, Agent, or Firm*—Skinner and Associates; Joel D. Skinner, Jr.

[57] ABSTRACT

An electronically controlled locking system for use with coin telephones. The system is preferably utilized in conjunction with and controlled by the Wesroc® Coin Phone Monitoring System. Existing coin phone lock mechanisms consist of a primary lock and a secondary lock. The primary lock actually physically secures the coin vault door in position. The secondary lock locks the primary lock in a locked position. Both locks are mechanical systems which are actuated by mechanical key devices of a common type and structure. This mechanical system is prone to fraud and theft. The present invention provides an electronically controlled latching mechanism for controlling the operation of the existing locking mechanisms.

3 Claims, 7 Drawing Sheets

ELECTRONIC LOCK FOR COIN TELEPHONES

BACKGROUND OF THE INVENTION

1. Field of the Invention

This invention relates to locking apparatus. More particularly, the invention relates to locking devices for use in securing coin telephones. The locking apparatus of this invention is useful for improving the security and control of coin collection in coin telephones.

2. Background Information

In the past, various devices have been used for securing coin telephones. A common locking mechanism used in coin telephones is entirely mechanical and consists of a primary lock which directly couples the vault door to the telephone body and a secondary lock which locks the primary lock in a closed or locked position. The primary lock is actuated with a standard T-Bar style key. Every T-Bar key is the same and will work with all primary locks. The secondary lock is actuated with a key of a common design, but which has an unique actuating configuration such that a particular key is dedicated to a single lock.

Personnel in charge of periodically collecting coins from coin telephones have access to the keys to both the primary and secondary locks. Typically, such personnel are employees or independent contractors for the coin telephone owner. The personnel have a designated route which they follow to collect coins and deliver the collected coins to the coin phone owner. It has been observed that, through a variety of techniques, collection personnel wrongfully take for themselves money collected from their route. The amount of theft or fraud which occurs is significant and despite efforts by coin phone owners to prevent or control these activities, they continue unabated. A significant, if not the most significant impediment to fraud/theft prevention is the fact that the mechanical key-based locking mechanisms are operable at any time of day and for as many times or key cycles as the user wishes. This enables the personnel to engage in multiple patterns of wrongful collection and to overcome even elaborate control and monitoring regimens imposed by the owners in an effort to prevent fraud/theft.

The use of mechanical key-based locks in coin telephones gives rise to numerous other problems in addition to employee theft/fraud including theft from the general public, high costs of apparatus procurement and maintenance, difficulties in tracking keys, the need to maintain a supply of back up keys and the use of non-standardized mechanisms.

U.S. Pat. No. 5,140,317 to Hyatt, Jr. et al. for Electronic Security System discloses an electronic lock mechanism with a dedicated electronic key. The lock mechanism includes a solenoid with a blocking structure. The key is battery powered and can only be used to operate the lock once with a given code. The key is reprogrammable by means of a computer.

Despite the need in the art for a coin telephone locking apparatus and method which overcome the shortcomings and limitations of the prior art, none insofar as is known has been developed or proposed. Accordingly, it is an object of the present invention to provide an improved system which overcomes the limitations and shortcomings of the prior art.

SUMMARY OF THE INVENTION

The apparatus of the present invention provides an electronically controlled locking system for use with coin telephones. The system is preferably utilized in conjunction with and controlled by the Wesroc® Coin Phone Monitoring System. Existing coin phone lock mechanisms consist of a primary lock and a secondary lock. The primary lock actually physically secures the coin box vault door in position. The secondary lock locks the primary lock in a locked position. Both locks are mechanical systems which are actuated by mechanical key devices of a common type and structure. This mechanical system is prone to fraud and theft. The present invention provides an electronically controlled latching mechanism for controlling the operation of the existing locking mechanisms.

In one aspect, the invention involves a coin box vault door lock for coin telephones, comprising an electrically actuatable latch including a solenoid, a locking plate having a predetermined configuration and being for locking engagement with the coin box vault door, and a biased connector connecting the locking plate to the solenoid and being for contact with a coin telephone; a latch connection bracket for connecting the latch to the coin telephone; and latch control means, the latch control means actuating the solenoid to remove the locking plate from locking engagement with the coin box vault door.

In another aspect the invention involves a coin box vault door lock for coin telephones of the type including a T-Bar actuated mechanical primary vault door lock including a rotary cam disk and a plurality of communicatively connected radially oriented locking bars, the cam disk having a connection member, the locking bars securing the vault door to the body of the coin phone in a locked mode, comprising:

(a) an electrically actuatable latch including a solenoid, a locking plate having a predetermined configuration and being for locking engagement with the coin box vault door connection member, and a biased connector connecting the locking plate to the solenoid, the solenoid being solely telephone line powered and further being in a normally unactuated mode, and the solenoid being actuated for a predetermined short time period, the biased connect or including a reciprocatingly movable shaft extending from the solenoid and being connected to the locking plate, a concentric bushing disposed about the shaft for setting a reciprocating retraction stroke distance of the shaft upon actuation of the solenoid, and a concentric spring disposed about the shaft and the bushing, and urging the locking plate away from the solenoid whereby the normally unactuated solenoid and the biased connector maintain the locking plate in a normally extended position, and wherein the locking plate has a rectangular body structure with a beveled first end and a notched first side, the notched first side being for locking mating with the cam disk connection member in the unactuated mode, the beveled first end permitting rotational passage of the cam disk connection end thereover in the unactuated mode;

(b) a latch connection bracket for connecting the latch to the coin telephone; and (c) latch control means, the latch control means actuating the solenoid to remove the locking plate from locking engagement with the coin box vault door.

The benefits of this invention will become clear from the following description by reference to the drawings.

DESCRIPTION OF THE PREFERRED EMBODIMENTS

The apparatus of the present invention is an electronically controlled locking system for use with coin telephones. The system is controlled by and utilized in conjunction with a remotely located computer via a telephone link to the coin phone. A preferred system is the Wesroc® Coin Phone Monitoring System manufactured and sold by applicants assignee, Independent Technologies, Inc. of Omaha, Nebr., USA, which utilizes a host computer located at a coin center office and a remote unit located at the coin phone. The Wesroc System is disclosed in allowed U.S. patent application Ser. No. 07/836,769, filed Feb. 14, 1992, which is incorporated by reference herein.

Figure 1:
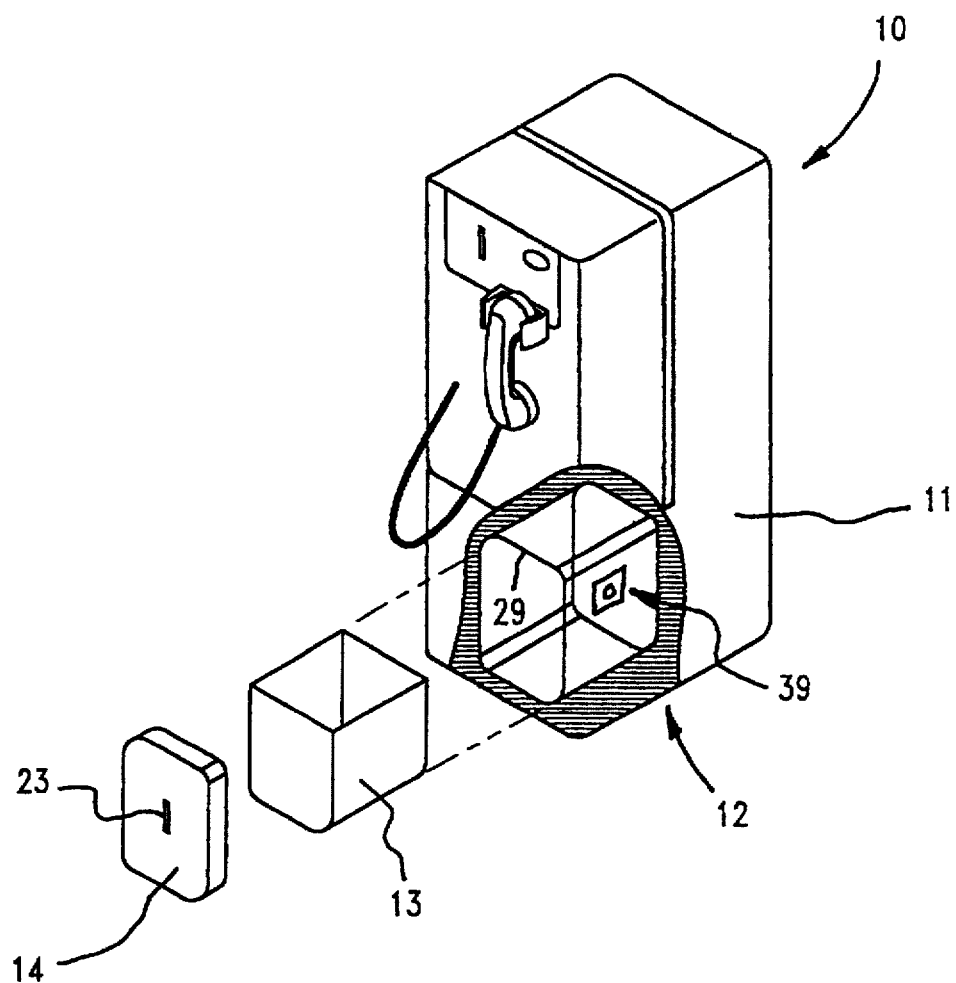
FIG. 1 is a perspective view of a common coin or pay telephone, partially in crossection and partially exploded showing a vault door, coin box and coin box vault.

The system is shown and described in an embodiment which cooperates with existing, prior art locking apparatus. This embodiment may thus be used to retrofit older telephones which are already in place. Because of the design of the system of this invention, such retrofitting may be easily, quickly and economically accomplished. The system may also be modified, consistent with the basic teachings of the invention, for use with new telephones on a primary mechanical locking system thereof Referring to FIG. 1, a typical coin or pay telephone 10 of the type found in a variety of public places and increasingly in non-public or semi-public places has a rectangular body 11 with, inter alia, a keypad, handset and cord, and a coin deposit slot. Although the primary telephone shown is of a type manufactured by AT&T/Northern Telcom, the apparatus of this invention is useable with other telephone types, including GTE telephones. A coin box vault 12 is a rectangular void area disposed at the bottom right hand corner of the telephone body 11. The vault 12 houses a coin box 13 wherein coins deposited during a predetermined use cycle of the telephone 10 are stored for later collection. The coin box 13 is a rectangular structure with an open top for reception of deposited coins and which has dimensions which are slightly less than corresponding dimensions of the vault 12 so that the box 13 and be inserted into and removed from a front face aperture 24 of the vault 12. A rectangular vault door 14, with curved inwardly disposed edges 36, has dimensions that are substantially equivalent with and seals the front face aperture 24 of the vault 12. The door 14 has a generally centrally disposed key slot 23. The key slot 23 receives a T-Bar style key (not shown) which operates a first locking mechanism as described in detail below. An additional key slot 39 is disposed on the right side of the telephone body 11. The key slot 39 receives a key of a common style (not shown) which operates a second locking mechanism also as described below.

Figure 2:
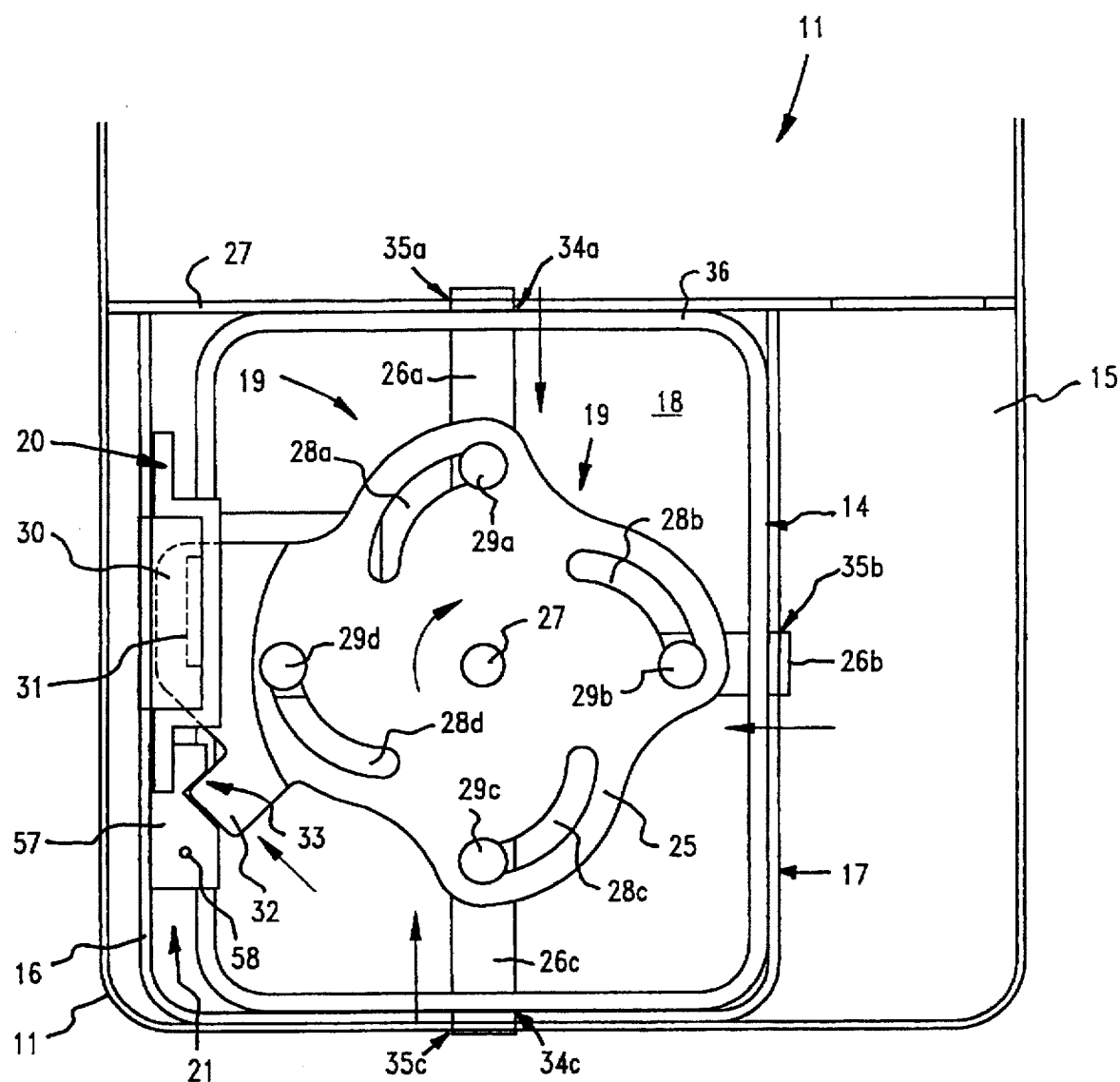
FIG. 2 is a view of the interior of a portion of an AT&T/Northern Telcom Type coin telephone showing primarily the inside or back of the vault door and a locking mechanism.
Figure 3:
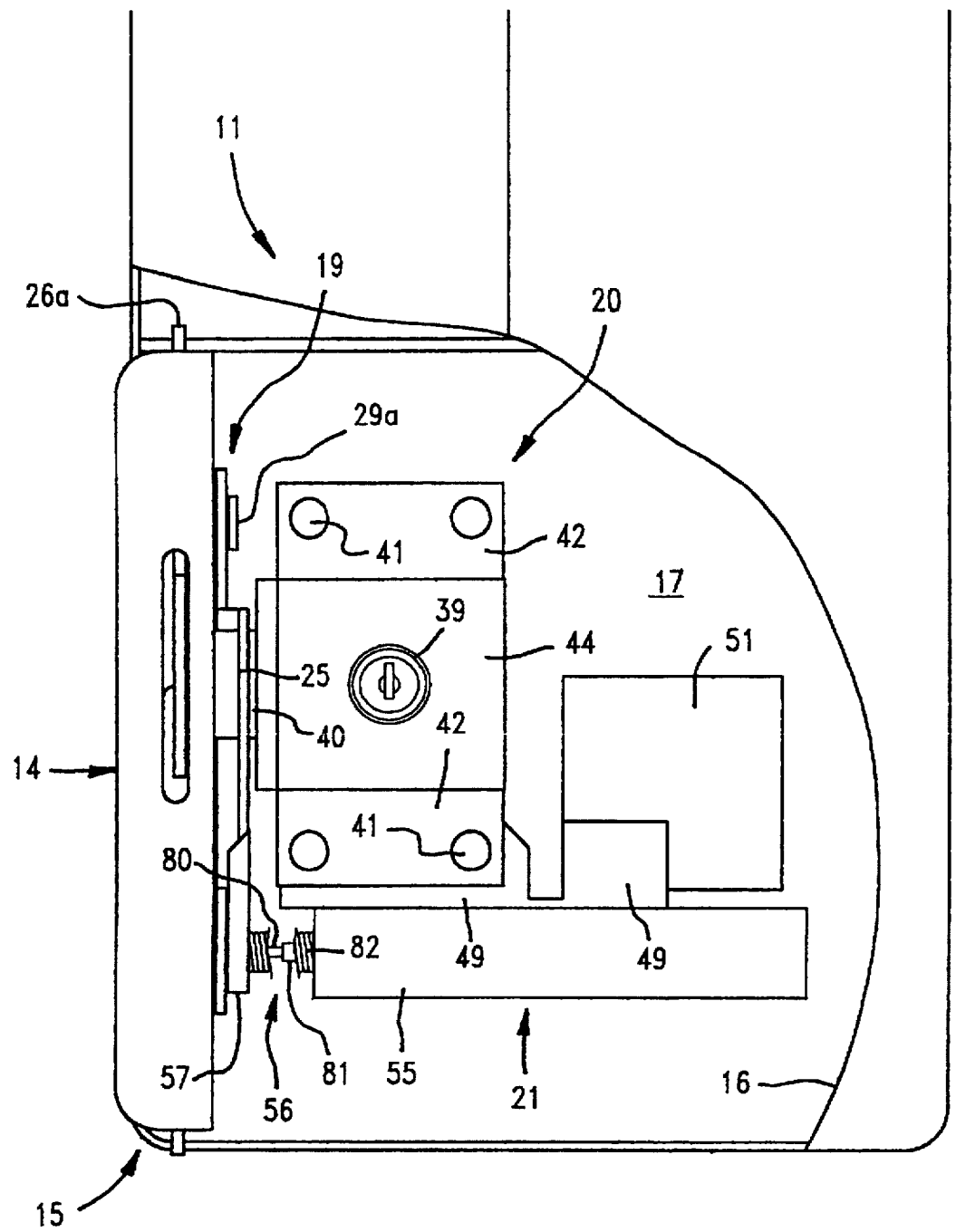
FIG. 3 is a view of the right side of a portion of the coin telephone, with a portion removed to show internal components.
Figure 4:
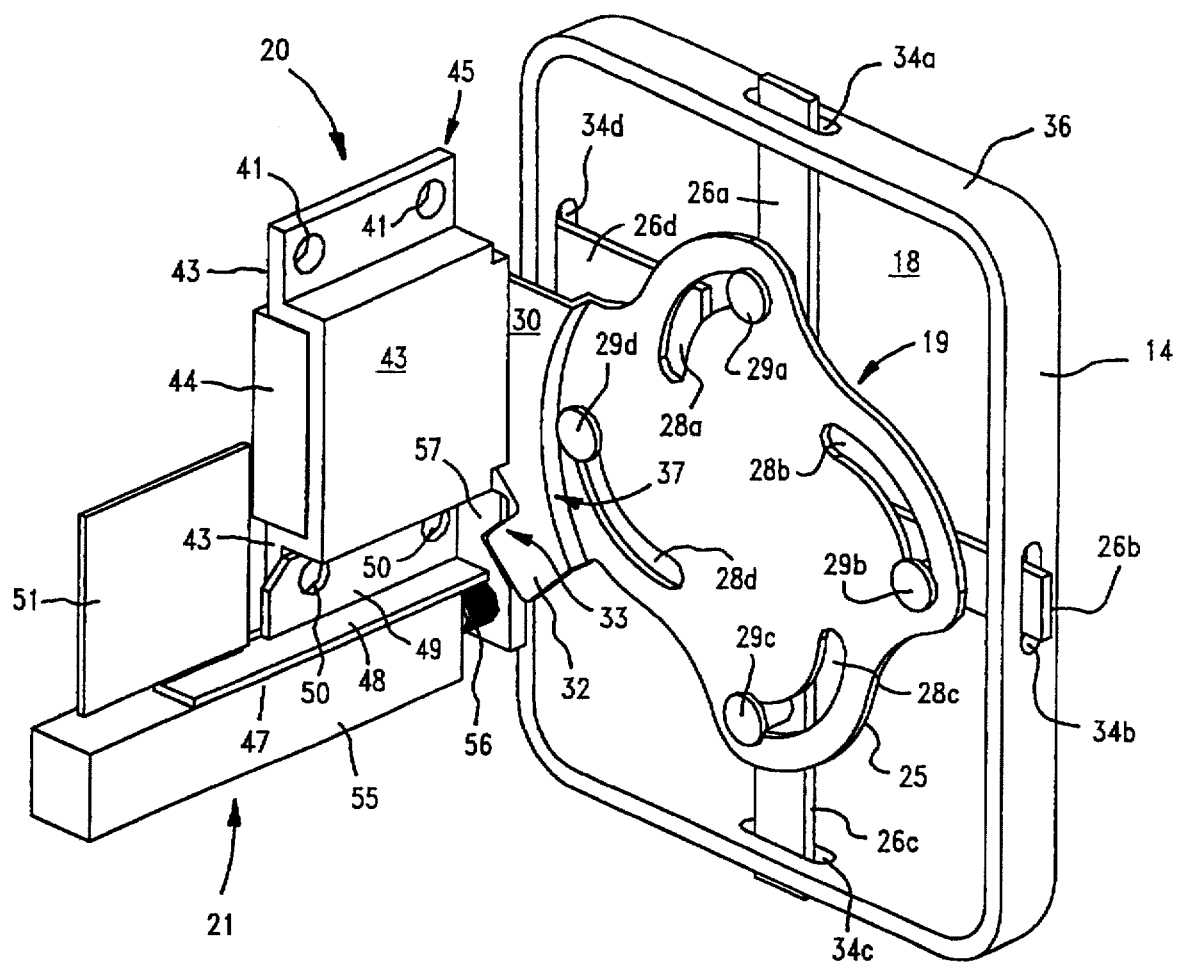
FIG. 4 is a perspective view of various internal components of the telephone including the vault door and the entire locking mechanism.
Figure 7:
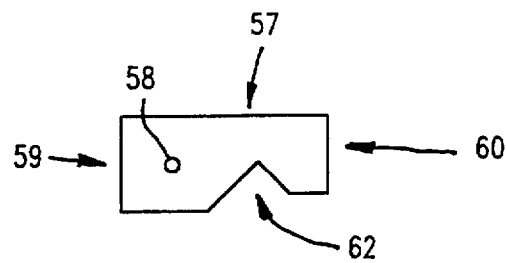
FIG. 7 is a top view of the locking component.
Figure 6:
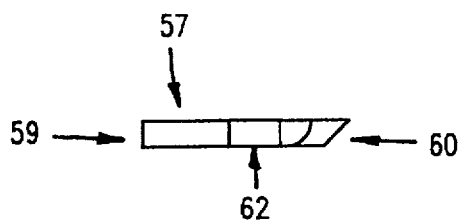
FIG. 6 is a side view of the locking component shown in FIG. 5.
Figure 8:
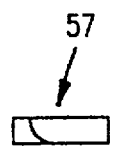
FIG. 8 is an end view of the locking component.
Figure 5:
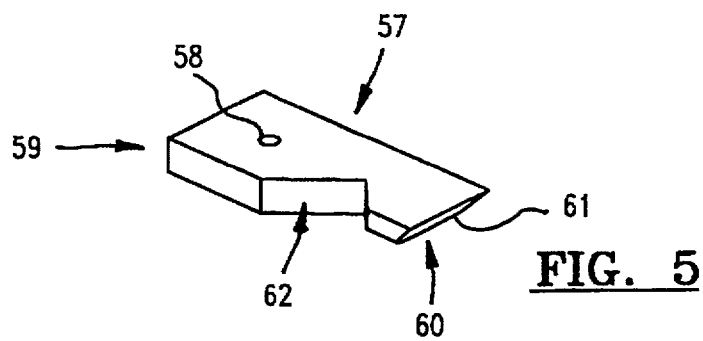
FIG. 5 is a perspective view of a locking component.

Referring to FIGS. 2–4, the coin telephone 10 has a well known double lock mechanism for locking the vault door 14 in place across the ingress/egress aperture 29. The mechanism consists of a primary or first lock 19 and a secondary lock 20. The primary lock 19 actually physically secures the vault door 14 in a predetermined position. The secondary lock 20 locks the primary lock 19 in a locked position. Both locks 19 and 20 are mechanical systems which are actuated by mechanical key devices of a common type and structure. The present invention provides an electronically controlled latching mechanism 21 for controlling the operation of the existing locking mechanisms 19 and 20. The electronic latch 21 is preferably controlled by the Wesroc System of Independent Technologies, Inc.

The primary lock 19 includes a slotted disk shaped cam plate or body 25 which has a plurality of (typically four) radially oriented locking bars 26 a–d attached to it via follower pins 29 a–d. The body 25 is a thin, flat metal structure which has a predetermined configuration. Included in this configuration is a slotted locking tab 37 shown on the left side of the body 25 in FIGS. 2 and 4. The slotted locking tab 37 has a first (upper) and second (lower) rectilinear portions 30 and 32 defined by a generally V-shaped slot or notch 33 in between the portions. A rectangular aperture 31 is disposed in the first or upper portion 30 for mating with an element of the secondary lock 20 as described below. A plurality of curved cam slots 28 a–d are disposed in the body 25 and mate with the follower pins 29. The body 25 is rotatable about a shaft 27, which is disposed in the center of the body 25. The shaft 27 is actuated by a T-Bar key via key slot 23 in the vault door face 14. From a normally locked position, as the disk 25 is rotated clockwise (as viewed from the inside or back of the disk 25) the pins 29 are moved toward the center of the disk 25 as they follow the contour of the grooves 28. The pins 29 pull the normally outwardly extended bars 26 in toward the center of the disk 25 also. As the bars 26 retract toward the center through apertures 34 a–d in the vault door 14, they clear their respective apertures 35 a–c in fixed structural members 22, 17, 15 and 16. Upon the bars 26 clearing these apertures 35, the vault door 14 may be removed from the ingress/egress aperture 29. The vault door 14 is locked in place by actuating the key in slot 23 to turn the plate 25 in the opposite direction, thereby outwardly extending the bars 26 so that they lodge in apertures 35.

The secondary lock 20 includes a lock mechanism 44 which is mounted to the left side interior structural member 16 via a bracket 45 having a central portion 43 and a pair of tabs 42 with apertures 41. The key slot 39 is disposed on the outwardly facing side of the lock mechanism 44 and is exposed to the exterior of the telephone via an aperture. Lock bar 40 is extendible outwardly and forwardly from the mechanism 44 for mating with the aperture 31 of the disk 25 upon actuation of the key slot 39. Mating of the bar 40 with the aperture 31 prevents rotation of the disk 25 and hence, actuation of the primary lock 19.

Figure 11:
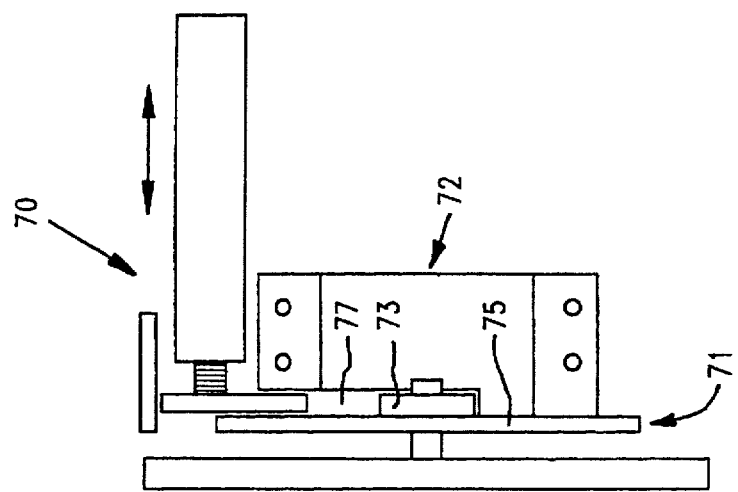
FIG. 11 is a side, interior view of the GTE phone.
Figure 10:
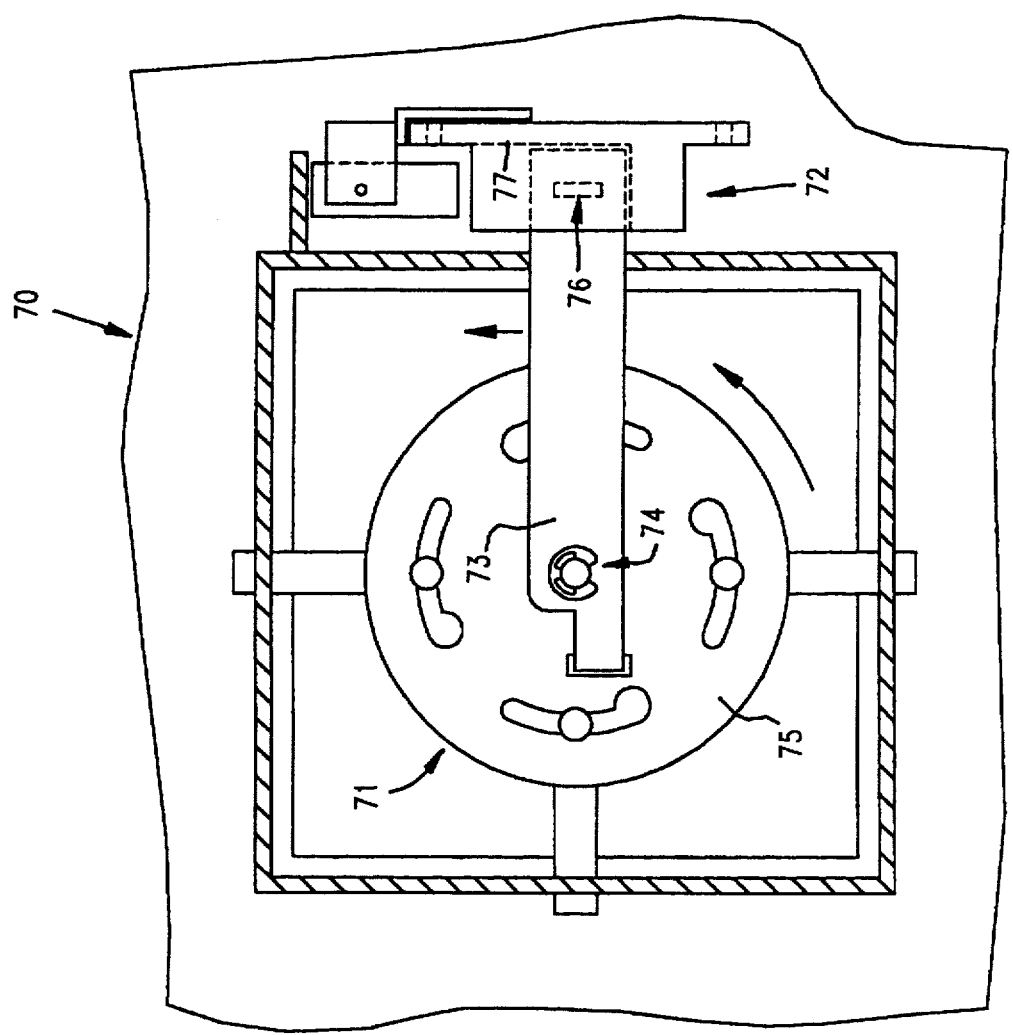
FIG. 10 is a back, interior view of a GTE-type coin phone.

Referring to FIGS. 10 and 11, GTE-type coin telephones 70 have a similar locking system with primary and secondary mechanisms 71 and 72, respectively. The secondary lock 72 is disposed on the opposite side of the primary lock 71 from that of the AT&T telephone 10 (not shown). Instead of the slotted locking tab, the GTE phone 70 has an arm 73 which is connected to and rotates with the center 74 of a cam plate 75. The arm 73 has an aperture 76 at its extended end which seats in an alignment groove 77 of the secondary lock 72 and mates with a perpendicularly disposed locking bar (not shown) therein.

Figure 9:
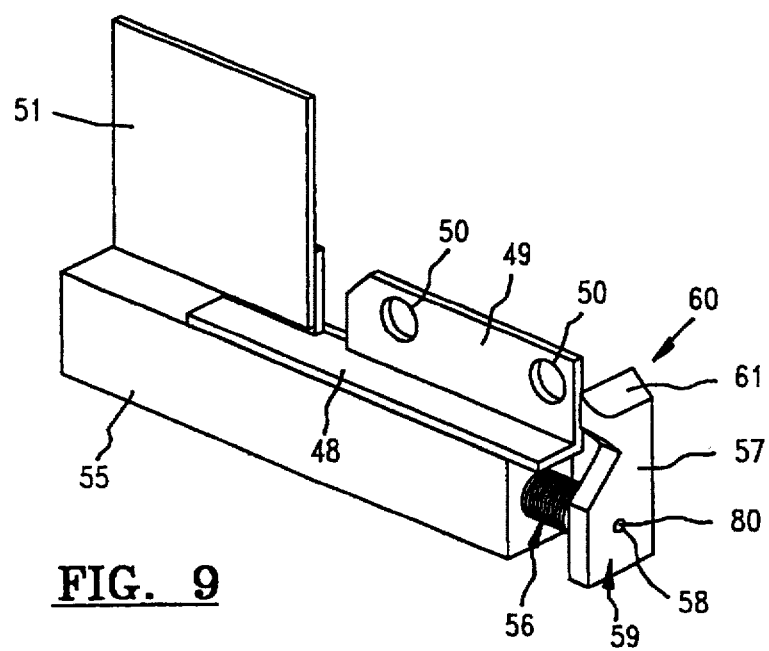
FIG. 9 is a perspective view of a locking component.

Referring to FIG. 9, the latching mechanism 21 comprises, generally, a solenoid 55, a mounting bracket 47 for mounting the solenoid 55 in a fixed position, and a control circuit 51 connected to the solenoid 55 and to the tip and ring conductors of the connected telephone line. The latching mechanism 21 is electronically controlled to engage and release the primary lock 19, in cooperation with the secondary lock 20 to permit actuation of the locks 19 and 20, and therefore access to the coin box 13 at predetermined times and to select personnel. It is within the purview of this invention that the latch mechanism may be incorporated into a unitary locking mechanism such as the secondary lock 20 to directly control its actuation.

The mounting bracket 47 is a bent or angled metal plate-like structure with a bifurcated first or upper member 49 which has a pair of securement apertures 50, and a second or lower member 48. The apertures 50 of the upper member 49 permit the bracket 47 to be retrofitted and connected to the inside of the telephone 10 via the apertures 41 in the secondary lock bracket 45. The lower member 48 extends at a right angle from the upper member 49 and is coupled to the solenoid 55 and to the control circuit 51. The lower member 48 holds the solenoid in a predetermined, horizontally disposed and forward facing, orientation. The lower member 48 also positions the control circuit 51.

Figure 12:
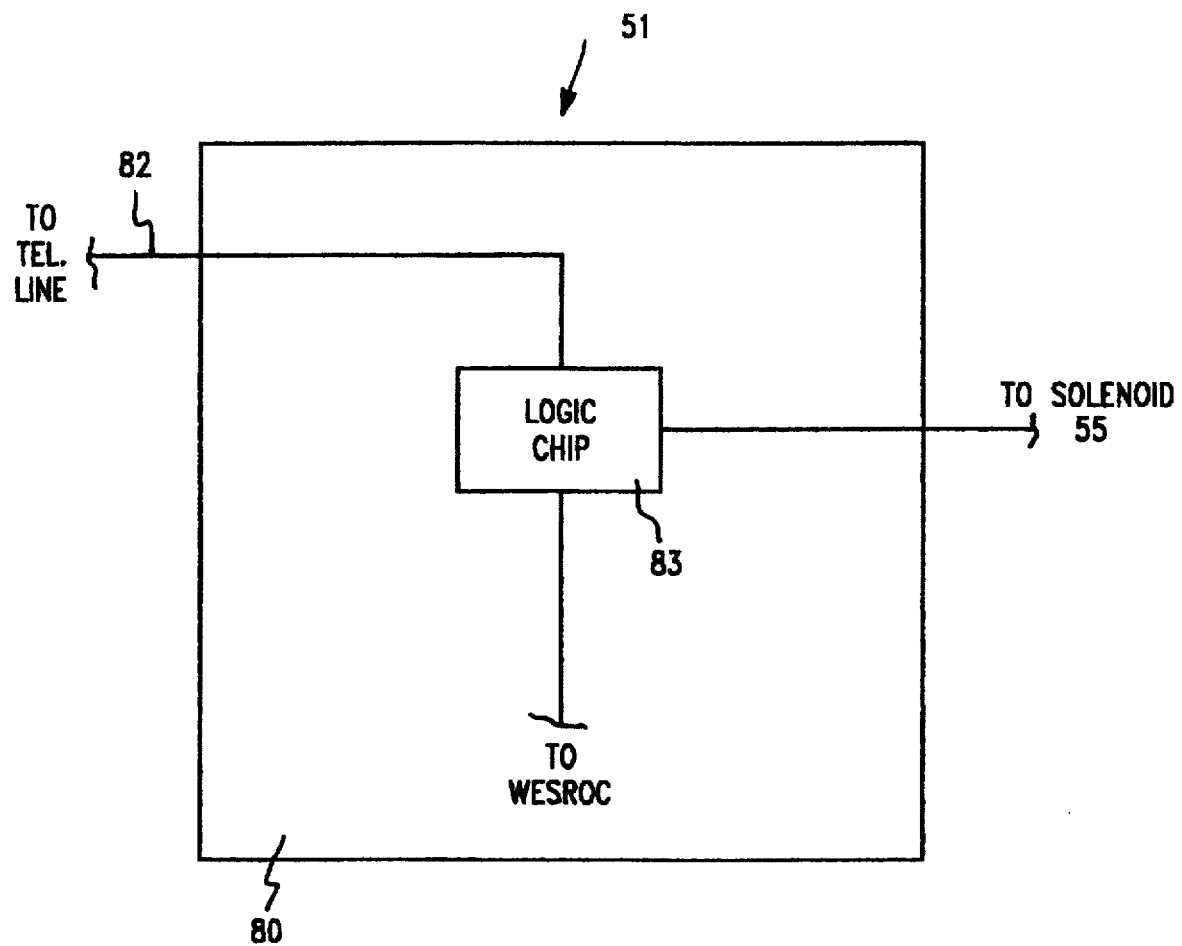
FIG. 12 is a schematic diagram of the control circuit of the locking component.

Referring also to FIG. 12, the control circuit 51 is preferably embodied on a printed circuit board (PCB) 80 connected to the upper bracket member 49. The control circuit 51 include capacitors which store charge from the telephone line 82 and a digital logic chip 83 connected to the capacitors, to the solenoid 55 and to a Wesroc system "Remote" Unit (not shown) residing in the telephone 10. The digital logic chip 83 receives control signals from the Wesroc remote unit to actuate the solenoid 55 by combining voltage from the telephone line 82 and the capacitors, and then passing the combined voltage to the solenoid 55. The chip 83 functions as an electronic lock which prevents the simple application of voltage by an unauthorized user in an attempt to actuate the solenoid 55.

The solenoid 55 has an elongated configuration and is coupled to the lower member 48 of the bracket 45. The solenoid 55 has a low operating voltage, is communicatively connected to the control circuit 51 and is powered, in part, by telephone line power. A locking or blocking plate 57 is connected to the forward end of the solenoid 55 via an extension assembly 56. As is described further below, the locking plate 57 locks the vault door 14 by blocking rotation of the primary lock 19. The extension assembly 56 consists of a shaft 80 (See FIG. 3), preferably a metal rod, which is inserted in an aperture 58 of the solenoid 55. The shaft is urged in a normally extended position by a spring 82 which concentrically surrounds the shaft and extends from the forward end of the solenoid 55 to the locking plate 57. Actuation of the solenoid 55 retracts the shaft against the force of the spring. A cylindrical collar bushing 81 of a predetermined length sets the linear retraction stroke length or distance of the locking plate 57. The collar bushing concentrically surrounds the shaft and is disposed between the shaft and the spring. The retraction stroke length is preferably 0.125 inches.

Referring also to FIGS. 5–8, the locking plate 57 is a rectilinear structure which is connected to the forward end of the solenoid 55 via an aperture 58 that receives the shaft end of extension assembly 56. The locking plate 57 locks the primary lock 19 in a locked position by wedging or seating in the notch 33 of the slot end 32 of the primary lock plate 25. Since the locking plate 57 is firmly connected to the fixed solenoid 55, the plate 57 blocks and prevents the plate 25 from rotating during attempted actuation at the key slot 23. The particular configuration of the locking plate 57 enables it to mate to and release from the slot 33 in the plate 25 through numerous cycles by simple straight-line movement provided by the solenoid 55. Importantly, the locking plate 57 configuration, placed as shown in the telephone 10, also cooperates with the interior structure of the telephone 19 in the locking process to yield exceptionally strong locking from simple lightweight components. As is best shown in FIG. 2, the plate 57 is wedged into the wall 16 of the telephone and the secondary lock 20 by rotational movement of the plate 25. The wall 16 and lock bracket 43, and not the shaft connected to aperture 58, receives a majority of the force from an attempted rotation of the plate 25 when the locking plate 57 is in a locked position. The electronic latch 21 of this invention jams the primary lock 19, in cooperation with the secondary lock 20 structure. This action is similar to that of a deadbolt and is virtually fail-safe.

The locking plate 57 is preferably constructed of stainless steel with an electroless nickel Teflon® impregnated coating. This material and coating has been found to provide optimal strength, protection from corrosive agents found in many pay telephone environments, and a low friction surface. The plate 57 may alternatively be constructed of black hard coat anodized die cast 360 aluminum. The plate 57 is approximately 1.2 inches in over all length and has a rectangular first or bottom end 59 with a width of approximately 0.55 inches and a thickness of approximately 0.15 inches. The opposite or second (top) end of the plate 57 is preferably slightly less wide, 0.45 inches, and less thick than the bottom end 59. The top end 60 has a beveled region 61 that faces forward in an operative orientation. A notch 62 is disposed in one side of the plate 57. As is best shown in FIG. 4, the notch 62 mates with the leading angled edge (with respect to clockwise rotation of the plate 25) of the slot end portion 32. This mating connection securely blocks rotation of the disk 25, even under pressure from an attempted forcible key actuation, and therefore prevents unlocking. In the locked configuration shown, the solenoid 55 is inactive and the locking plate 57 is in its normally extended and blocking position. In GTE phones, the locking plate blocks counterclockwise (as viewed from the interior and back) and upward movement of the locking arc out from the secondary lock. The locking plate is also oriented to be wedged against a top interior surface of the telephone for contact with the arm end. Upon solenoid 55 activation, the locking plate 57 is retracted approximately 0.125 inches. The plate 25 is rotatable for unlocking.

In use, the solenoid 55 is actuated upon entry of a code by coin collection personnel via the telephone key pad. The code is preferably seven (7) digits and is generated by the Wesroc system host unit (located at a remote central office) and communicated or reported to the remote unit (located at the phone 10) via the telephone line. The code is generated at the time of the last coin collection. It is stored in the remote at that time and may be given to collection personnel just prior to a collection visit. The remote recognizes the code when it is entered by the personnel. The solenoid 55 is activated for only approximately 10 seconds to permit actuation of the primary lock 19 in a short window of time. The short time period decreases the likelihood of fraud being committed by coin collection personnel. The short actuation period for the solenoid 55 also conserves energy use, which is critical because the solenoid 55 is preferably powered solely by low telephone line voltage.

The solenoid 55 is actuated by the simultaneous series connection thereto of both telephone line current and stored charge from the capacitors of the control circuit 51. This connection is made when the Wesroc remote receives the appropriate entry code. The remote signals the digital logic chip 83 of the control circuit 51 to combine existing telephone line current with stored charge from the capacitors, and to allow the combined voltage to pass to the solenoid 55. The combined series voltage at the solenoid 55 retracts the locking plate 57. A battery disposed in the coin phone 10 may alternatively provide solenoid actuation voltage.

During the actuation period of the solenoid 55, the primary lock 19 is actuated by personnel turning the T-Bar (after actuation of the secondary lock 20) and the disk 25 rotates clockwise, free of the retracted locking plate 57. The vault door 14 may then be removed by collection personnel to gain access to the coin collection box. 13. This process takes approximately one (1) minute. After the solenoid actuation period, the spring on the extension assembly 56 returns the locking plate 57 to its extended position. After the coin collection box 13 is returned to the vault 12, the door 14 is replaced and the primary lock 19 is actuated to re-lock the door 14. Referring still to FIG. 4, re-locking involves counterclockwise rotation of the disk 25. Since the locking plate 57 is in its fully extended position, solenoid 55 actuation having been terminated and the spring urging it outward, the plate end 32 must contact and move past the locking plate 57. This is made possible by the beveled edge 61. The edge 61 smoothly moves over the plate end 32 as the locking plate 57 is depressed, against the force of the extension assembly 56 spring, by the plate end 32. As the plate end 32 rotationally moves into a locked position, the locking plate 57 re-mates with the notch 33 due to the biasing force provided by the extension assembly 56 spring.

During the coin collection procedure, a new entry code is assigned. Assignment of a new code prevents actuation of the locks 19 and 21 until an appropriate later time. Removal of the coin box 13 actuates an electronic switch commonly known as a "box-out" switch. Actuation or opening of this switch (not shown) signals a "box collect" condition to the Wesroc remote unit. Replacement of the coin box 13 re-closes the box out switch and signals the remote unit that collection is complete. Upon receiving this signal, the Wesroc remote is programmed to call the host over the first available coin line, to report the coin collection to the host, and to receive a new code from the host.

As many changes are possible to the embodiments of this invention utilizing the teachings thereof, the descriptions above, and the accompanying drawings should be interpreted in the illustrative and not the limited sense.

The invention claimed is:

1. A coin box vault door lock for a coin telephone, comprising an electrically actuatable latch including a solenoid, a locking plate having a predetermined configuration and being for locking engagement with the coin box vault door, and a biased connector connecting said locking plate to said solenoid; a latch connection bracket for connecting said latch to the coin telephone; and a latch control circuit connected to said solenoid and to a telephone line connected to the coin telephone, said latch control circuit storing charge from the telephone line and combining stored voltage with direct telephone line voltage for solenoid actuation, whereby said solenoid removes said locking plate from locking engagement with the coin box vault door.

2. A coin box vault door lock for coin telephones including a mechanical primary vault door lock including a rotary cam disk and a plurality of communicatively connected radially oriented locking bars, the cam disk having a connection member, the locking bars securing said vault door to a body of the coin phone in a locked mode, comprising:

(a) an electrically actuatable latch including a solenoid, a locking plate having a predetermined configuration and being for locking engagement with the coin box vault door connection member, and a biased connector connecting said locking plate to said solenoid, said locking plate having a rectangular body structure with a beveled first end and a notched first side, said notched first side being for locking mating with said cam disk connection member, said beveled first end permitting rotational passage of the cam disk connection member thereover for re-locking mating with the disk cam connection member;

(b) a latch connection bracket for connecting said latch to the coin telephone; and (c) latch control circuit connected to said solenoid and to a telephone line connected to the coin telephone, said latch control circuit comprising a digital logic chip connected to the telephone line, to control signal input means, and to the solenoid, said latch control circuit storing charge from the telephone line and combining stored voltage with voltage directly from the telephone line to actuate said solenoid to remove said locking plate from locking engagement with the coin box vault door, said latch control circuit deriving power exclusively from the telephone line.

3. A coin box vault door lock for coin telephones type including a T-Bar actuated mechanical primary vault door lock and a mechanical key actuated secondary vault door lock, the primary vault door lock including a rotary cam disk and a plurality of communicatively connected radially oriented locking bars, the cam disk having a connection member, the locking bars securing said vault door to a body of the coin phone in a locked mode, the secondary vault door lock including a locking bar for locking engagement with the cam disk connection member to lock the primary lock in the locked mode, comprising:

(a) an electrically actuatable latch including a solenoid, a locking plate having a predetermined configuration and being for locking engagement with the coin box vault door cam disk connection member, and a biased connector connecting said locking plate to said solenoid, said solenoid being solely telephone line powered and being in a normally unactuated mode, and said solenoid being actuated for a predetermined short time period, said biased connector including a reciprocatingly movable shaft extending from said solenoid and being connected to said locking plate, a concentric bushing disposed about said shaft for setting a reciprocating retraction stroke distance of said shaft upon actuation of said solenoid, and a concentric spring disposed about said shaft and said bushing, and urging said locking plate away from said solenoid whereby said normally unactuated solenoid and said biased connector maintain said locking plate in a normally extended position, and wherein said locking plate is for blocking opening rotation of said primary vault door lock rotary cam disk, said locking plate having a rectangular body structure which permits mating and release from said cam disk connection member, said rectangular body structure having a beveled first end, and a notched first side, said notched first side being for locking mating with said cam disk connection member in said unactuated mode, said locking plate further abutting an interior surface of the telephone on a second side opposite said first side in said unactuated mode to strengthen said blocking opening rotation of the cam disk, said beveled first end contacting and permitting unassisted rotational passage of said cam disk connection member thereover in said unactuated mode;

(b) a latch connection bracket for connecting said latch to the coin telephone; and (c) a latch control circuit connected to said solenoid and to a telephone line connected to the coin telephone, said latch control circuit comprising a digital logic chip connected to the telephone line, to a control signal input means, and to the solenoid, said latch control circuit storing charge for and controlling actuation of said solenoid, whereby said latch control circuit derives power exclusively from the telephone line and actuates said solenoid by combining stored charge and direct line current from the telephone line to remove said locking plate from locking engagement with said coin box vault door.

* * * * *